United States Patent
Knoll et al.

(10) Patent No.: US 6,841,211 B1
(45) Date of Patent: Jan. 11, 2005

(54) CONTAINERS HAVING IMPROVED BARRIER AND MECHANICAL PROPERTIES

(75) Inventors: Robert Knoll, Neenah, WI (US); Chad Mueller, Appleton, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

(21) Appl. No.: 09/569,569

(22) Filed: May 12, 2000

(51) Int. Cl.⁷ .................. B28B 21/00; B28B 21/72; B28B 23/08; B29D 22/00; B29D 23/00
(52) U.S. Cl. .................. 428/34.5; 428/35.7; 428/36.91; 428/36.92; 428/36.6; 428/333; 428/338; 428/339; 428/474.4; 428/34.6; 428/34.7
(58) Field of Search ............... 428/35.7, 35.9, 428/36.4, 297.4, 300.7, 391, 500, 516, 517, 521, 474.4, 36.9, 36.91, 36.92, 36.7, 36.6, 333, 338, 339, 34.1, 34.6, 34.7, 34.4, 34.5

(56) References Cited

U.S. PATENT DOCUMENTS

| | | | |
|---|---|---|---|
| 2,531,396 A | 11/1950 | Carter et al. ............... 260/41.5 |
| 4,342,398 A | * 8/1982 | Chang ........................ 215/1 |
| 5,328,975 A | 7/1994 | Hanson et al. ............... 528/29 |
| 5,352,493 A | 10/1994 | Dorfman et al. ............ 427/530 |
| 5,385,776 A | 1/1995 | Maxfield et al. ............ 428/297 |
| 5,401,587 A | 3/1995 | Motohiro et al. ........... 428/688 |
| 5,514,734 A | 5/1996 | Maxfield et al. ............ 523/204 |
| 5,552,469 A | 9/1996 | Beall et al. ................. 524/445 |
| 5,554,670 A | 9/1996 | Giannelis et al. ........... 523/209 |
| 5,556,678 A | 9/1996 | Jupin et al. ................. 428/36.6 |
| 5,573,783 A | 11/1996 | Desieno et al. ............. 424/490 |
| 5,578,672 A | 11/1996 | Beall et al. ................. 524/446 |
| 5,604,038 A | 2/1997 | Denes et al. ................ 428/429 |
| 5,705,222 A | 1/1998 | Somasundaran et al. .... 427/320 |
| 5,716,709 A | 2/1998 | Ferguson et al. ............ 428/420 |
| 5,733,644 A | 3/1998 | Tanaka et al. ............... 428/215 |
| 5,747,560 A | 5/1998 | Christiani et al. ........... 523/209 |
| 5,760,106 A | 6/1998 | Pinnavaia et al. ........... 523/209 |
| 5,763,101 A | 6/1998 | Yoshimi et al. ............. 428/524 |
| 5,795,648 A | 8/1998 | Goel et al. .................. 428/336 |
| 5,801,216 A | 9/1998 | Pinnavaia et al. ........... 523/209 |

(List continued on next page.)

FOREIGN PATENT DOCUMENTS

| | | | | |
|---|---|---|---|---|
| EP | 0639145131 | | 2/1995 | |
| EP | 0 995 591 A | | 4/2000 | |
| JP | 01139347 | | 5/1989 | |
| WO | WO 98/01346 | | 1/1998 | |
| WO | WO 98/10012 | | 3/1998 | |
| WO | WO 98/29491 | | 7/1998 | |
| WO | WO 98/29499 | | 7/1998 | |
| WO | 98/53000 | * | 11/1998 | ............ C08K/3/34 |
| WO | WO 99/01504 | | 1/1999 | |
| WO | WO 99/02593 | | 1/1999 | |
| WO | 99/07790 | * | 2/1999 | ........... C08L/51/00 |
| WO | WO 99/32403 | | 7/1999 | |
| WO | WO 99/35185 | | 7/1999 | |
| WO | WO 99/35186 | | 7/1999 | |
| WO | WO 99/47598 | | 9/1999 | |
| WO | WO 99/49991 | | 10/1999 | |
| WO | WO 00/34376 | | 6/2000 | |
| WO | WO 01/04197 | | 1/2001 | |
| WO | WO 01/40369 | | 6/2001 | |

*Primary Examiner*—Sandra M. Nolan
*Assistant Examiner*—Michael C. Miggins
(74) *Attorney, Agent, or Firm*—McDermott Will & Emery LLP

(57) ABSTRACT

The present invention relates to containers for flowable products having improved barrier and/or mechanical properties and methods for making said containers. These improvements are achieved by incorporating into at least one layer of the container structures a polymeric nanocomposite comprising a polymer and nanosize particles of a modified clay.

9 Claims, 1 Drawing Sheet

U.S. PATENT DOCUMENTS

| | | | |
|---|---|---|---|
| 5,807,629 A | 9/1998 | Elspass et al. | 428/323 |
| 5,837,763 A | 11/1998 | Ferraro et al. | 524/449 |
| 5,844,032 A | 12/1998 | Serrano et al. | 524/445 |
| 5,858,457 A | 1/1999 | Brinker et al. | 427/162 |
| 5,866,645 A | 2/1999 | Pinnavaia et al. | 524/443 |
| 5,876,812 A * | 3/1999 | Frisk et al. | 428/35.7 |
| 5,877,248 A | 3/1999 | Beall et al. | 524/450 |
| 5,880,197 A | 3/1999 | Beall et al. | 524/445 |
| 5,883,173 A | 3/1999 | Elspass et al. | 524/446 |
| 5,910,523 A | 6/1999 | Hudson | 523/213 |
| 5,916,685 A | 6/1999 | Frisk | 428/446 |
| 5,952,095 A | 9/1999 | Beall et al. | 428/332 |
| 5,958,514 A | 9/1999 | Havey et al. | 427/386 |
| 5,962,553 A | 10/1999 | Ellsworth | 523/216 |
| 5,972,448 A | 10/1999 | Frisk et al. | 428/35.7 |
| 6,117,541 A | 9/2000 | Frisk | 428/327 |
| 6,203,923 B1 | 3/2001 | Bansleben et al. | 428/500 |
| 6,217,962 B1 | 4/2001 | Werth | 428/36.9 |

\* cited by examiner

CONTAINERS HAVING IMPROVED BARRIER AND MECHANICAL PROPERTIES

The present invention relates to containers for flowable products having improved barrier and/or mechanical properties and methods for making said containers. These improvements are achieved by incorporating into the container structures a polymeric nanocomposite comprising a polymer and nanosize particles of a modified clay.

DESCRIPTION OF THE PRIOR ART

It has been known to manufacture compositions which comprise modified clays in a polymeric base. These compositions are known as nanocomposites.

Carter, et al., U.S. Pat. No. 2,531,396 discloses a reinforced elastomer and a process for producing said elastomer which contains a modified clay. The clay of the invention includes montmorillonite, viz, sodium, potassium, lithium and other bentonites. The clay is characterized by an unbalanced crystal lattice which are believed to have negative charges neutralized by inorganic cations.

Frisk, U.S. Pat. No. 5,916,685 discloses a transparent multilayer laminate containing nanoparticulates having superior barrier properties to oxygen, water vapor and aromatic gases.

Frisk, et al., U.S. Pat. No. 5,876,812 disclose a container made of polymeric material which contain nanoparticulates to increase barrier properties.

Frisk, et al., U.S. Pat. No. 5,972,448 disclose a container made from a polymer material which has been integrated with a plurality of nanosize particles.

Serrano, et. al., U.S. Pat. No. 5,844,032 discloses the manufacturing of nanocomposites which are intercalated and combined with an EVOH matrix polymer.

Beall, et al., U.S. Pat. No. 5,952,095 disclose how to make specific intercalated nanoparticulates. The disclosure teaches nanoparticulates themselves, as well as methods of making them in addition to organic liquid compositions containing nanoparticulates.

Beall, et al., U.S. Pat. No. 5,880,197 disclose clays treated with organic molecules which when so treated intercalate the clay particles to create a matrix-like structure.

Beall, et al., U.S. Pat. No. 5,877,248 disclose a method of increasing the viscosity of an organic liquid by combining it with nanocomposite materials having specific characteristics/limitations.

Beall, et al., U.S. Pat. No. 5,578,672 disclose intercalates formed by mixing a phyllosilicate with a polymer and a liquid carrier, and extruding the mixture through a die-opening to absorb or intercalate the polymer between adjacent phyllosilicate platelets.

Christiani, et al., U.S. Pat. No. 5,747,560 disclose a process for making polymeric nanocomposite materials wherein the platelet particles have an average thickness equal to or less than about 50 Å and a maximum thickness of about 100 Å.

Maxfield, et al., U.S. Pat. No. 5,514,734 disclose a process of forming nanocomposite material comprising a polymer matrix comprising a polymeric material and dispersed particles selected from the group consisting of platelet or fibrillar particles having specific characteristics.

Maxfield, et al., U.S. Pat. No. 5,385,776 disclose a composite formed from a gamma phase polyaride having dispersed therein a particulate material such as a phyllosilicate.

Alexandre, et. al., WO 99/47598, disclose a nanocomposite which is a dispersion of nanofiller particles derived from layered metal oxides or metal oxide salts. The nanocomposite is advantageously prepared by first swelling an untreated clay in water, then removing the water to form an organophilic clay that is dispersible in non-polar organic solvents. The organophilic clay can then be treated with an alkyl aluminoxane and subsequently a catalyst to form a complex that promotes olefin or styrenic polymerization and platelet dispersion. The nanocomposite can be prepared directly by in situ polymerization of the olefin or the styrene at the nanofiller particles without shear, without an ion exchange step, and without the need to incorporate polar substituents into the polyolefin or polystyrene.

Fischer, et al., WO 99/35185 disclose a method for preparing a nanocomposite material based on a polymeric matrix and a layered double hydroxide. The disclosure further relates to a nanocomposite material obtainable by such method and to a shaped article manufactured from such nanocomposite material Barbee, et al., WO 99/32403 disclose a composition comprising a polymer having dispersed therein at least one layered clay material which has been cation exchanged with organic cation salts; and at least one expanding agent which is compatible with said polymer. Preferred polymers include polyesters. The compositions of the disclosure show vastly improved platelet separation as evidenced by higher than previously reported basal spacing. The disclosure further relates to polyester composite materials having improved barrier useful for forming packages that have improved gas barrier properties.

Fischer, WO 99/07790 discloses a nanocomposite material on the basis of a clay having a layered structure and a cation exchange capacity of from 30 to 250 milliequivalents per 100 grams, a polymeric matrix and a block copolymer or a graft copolymer, which block copolymer or graft copolymer comprises one or more first structural units, which are compatible with the clay, and one or more second structural units, which are compatible with the polymeric matrix. Fischer further discloses a nanocomposite material wherein the clay has a cation exchange capacity of from 50 to 200 milliequivalents per 100 gram. In addition, Fischer discloses a nanocomposite material wherein the polymeric matrix is selected from the group consisting of polyolefins, vinyl polymers, polyesters, polyethers, polysiloxanes and acrylic polymers.

Li, et al., WO 98/53000 disclose toughened nanocomposite materials which are prepared based on a blend of one or more thermoplastic engineering resins, e.g., nylon, a functionalized, e.g., brominated, copolymer of a $C_4$–$C_7$ isomonoolefin, e.g., isobutylene, and a para-alkylstyrene, e.g., para-methylstyrene, and further contain a uniformly dispersed exfoliated phyllosilicate layered clay, e.g., montmorillonite. The nanocomposite materials exhibit superior mechanical properties, including enhanced impact strength. The composition of this disclosure may be extruded, compression molded, blow molded or injection molded into various shaped articles including fibers, films, industrial parts such as automotive parts, appliance housings, consumer products, packaging and the like. The resulting articles exhibit both high impact strength and low vapor permeability.

Matayabas, et al., WO 98/29499 disclose polyester-platelet particle composite compositions comprising about 0.01 to about 25 weight percent platelet particles dispersed in at least one polyester wherein said composition has an intrinsic viscosity of greater than about 0.55 dl/g, low shear melt viscosity greater than about 30,000 poise and a gas permeability which is at least 10% lower than that of unmodified polyester.

Frisk, et. al., WO 98/01346 disclose a container which is composed of a polymer material integrated with a plurality of nanosize particles of a modified clay which act to enhance the barrier properties of the container. The polymer material may be PET, COPET or any mixture thereof. The nanocomposite polymer container decreases the permeability of various gases without substantially altering the fabrication method for producing containers composed of PET or COPET material, and without altering the containers themselves. The nanocomposite polymer containers of the disclosure are able to accomplish this due to the minimal amount of clay integrated with the polymer material, i.e., between 0.1% and 10% weight of the container. The small amount of clay provides a substantial barrier due to the high aspect ratios of the clay particles which will vary between 100 and 2000. The nanocomposite polymer container may be produced using in situ polymerization, solution intercalation, or melt exfoliation to integrate the modified clay with the polymer material matrix. The modified clay may be smectite, vermiculite, halloysite or any synthetic analog thereof, with a preference for the montmorillonite species of smectite clays.

SUMMARY OF THE INVENTION

This invention relates to containers for flowable products having improved barrier and/or mechanical properties wherein at least one layer of the containers comprises a polymeric nanocomposite comprising a polymer and nanosize particles of a modified clay, and methods of making the containers. The invention further relates to containers for flowable products comprising a finish, a main body, and a base wherein at least one of said layers of said finish, main body or base comprising a polymeric nanocomposite, wherein said nanocomposite comprises a polymer and nanosize particles of a modified clay.

DETAILED DESCRIPTION OF THE INVENTION

Figure 1:
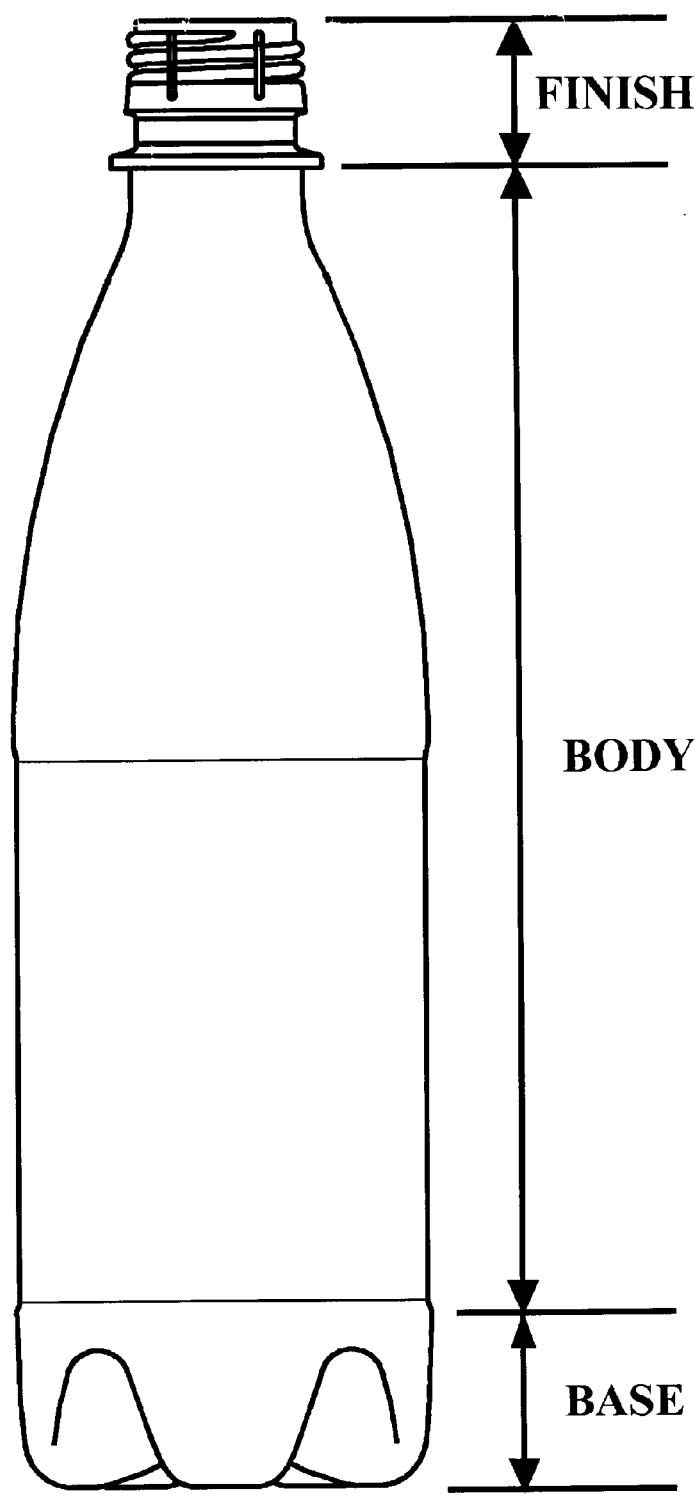
FIG. 1 is an illustration of a container comprising three sections, a finish, a body and a base.

Clays such as smectite clays which are further exemplified by montmorillonite, nontronite, beidellite, volkonskoite, hectorite, saponite, sauconite, magadite, kenyaite and vermiculite are composed of packets of face to face stacking of individual silicate layers or sheets. In nature, the metal ions are substituted for ions such as Mg, Fe, Mn and Li. Because of this substitution, the sheets have a negative charge imbalance that is neutralized by hydratable cations such as sodium and calcium. The thickness of the sheets is about 1 nm and the diameter of the sheets is typically from 50 to 1000 nm resulting in aspect ratios of 50 to 1000. These clays are also known as phyllosilicates.

It is known that these clays can be treated with organic molecules such as, e.g., organic ammonium ions to insert the organic molecules between adjacent planar silicate layers thereby increasing the interlayer spacing between the adjacent silicate layers. This process is known as intercalation and the resulting treated clay mineral is termed "modified clay." The thus-treated intercalated phyllosilicates have interlayer spacing of at least 10–20 Å and up to about 100 Å. The modified clay may then be used in at least two distinct methods for preparing nanocomposites, i.e., melt compounding and in situ polymerization. Both methods are known to those skilled in the art. The preferred method of melt compounding of nanocomposites is with a twin-screw extruder or similar blending apparatus. In order to achieve good intercalation, exfoliation and dispersion of the clays, processing conditions should be such that both shear rate and residence time are optimized.

In addition to these methods, the clay can also be incorporated into liquid coatings or adhesives. As with melt compounding, processing conditions should be such that both shear rate and residence time are optimized. The adhesive or coating may consist of monomer, oligomer, polymer or mixtures thereof and may undergo polymerization after it has been applied to a substrate.

The amount of modified clay material combined with the polymer should be in an amount that is sufficient to provide the desired barrier and/or mechanical properties. The amount of modified clay material in the nanocomposites of the invention comprises about 0.1% to about 25% by weight of the nanocomposite. A preferred range of modified clay material comprises about 0.5% to about 10% by weight of the nanocomposite. A most preferred range is about 2% to about 7% by weight of the nanocomposite.

Polymers suitable for use in the nanocomposites of the present invention are exemplified, but not limited to, polyolefins such as low density polyethylene (LDPE), linear low density polyethylene (LLDPE), medium density polyethylene (MDPE), high density polyethylene (HDPE), and polypropylene (PP), polyamides such as poly(m-xyleneadipamide) (MXD6), poly(hexamethylenesebacamide), poly(hexamethyleneadipamide) and poly(-caprolactam), polyesters such as poly(ethylene terephthalate), and polyacrylonitriles. Other polymers suitable for use in the nanocomposites of the invention include ethylene vinyl alcohol copolymers, ethylene vinyl acetate copolymers, polyesters grafted with maleic anhydride, PVdC, aliphatic polyketone, and LCP (liquid crystalline polymers). A polyketone is exemplified by Carillon® which is produced by Shell. A liquid crystalline polymer is exemplified by Vectra® which is produced by Ticona. Further polymers that may be used include epoxy and polyurethane adhesives.

While certain clays have been exemplified above it is understood that any clay (both natural and synthesized) having a cation-exchange capacity of 50 to 200 milliequivalent/100 g and a large contact area with the polymer to be used in said nanocomposite are useful in the present invention.

Definition of Terms

Unless specifically set forth and defined or otherwise limited, the following terms as used herein have the following meanings.

Adhesive shall mean substances which bind/adhere; adhesives as used herein can generally be classified either as tie resins or laminating adhesives.

Aspect Ratio shall mean the ratio of a particular object's width to its thickness.

Barrier shall mean a material or a material structure such as a film, layer, membrane or surface coating which prevents the penetration or permeation of vapors or gases through or beyond the material or material structure acting as the barrier. Such barriers may be selective or non-selective depending on whether or not the barrier acts to prevent a specific (or number of specific) vapors or gases to penetrate or permeate the barrier material or structure. Thus, a water vapor or moisture barrier would prevent penetration or permeation by water vapor, an oxygen barrier would prevent penetration by oxygen (for example, oxygen as contained in the atmosphere) and a flavor or aroma barrier would prevent penetration by complex organic molecules that impart flavor or aroma. These barriers may act to prevent penetration or permeation by vapors or gases by means of certain physical or chemical properties that the barrier material or barrier structure possesses.

Core or core layer shall mean an interior layer of a multilayer film having an odd number of layers wherein the same number of layers is present on either side of the core layer.

Epoxy shall mean a compound containing an epoxide functionality.

Ethylene vinyl acetate copolymer (EVA) shall mean a copolymer formed from ethylene and vinyl acetate monomers wherein the ethylene derived units in the copolymer are present in major amounts and the vinyl acetate derived units in the copolymer are present in minor amounts.

Ethylene vinyl alcohol copolymer (EVOH) shall mean a copolymer formed by the hydrolysis of poly(vinyl acetate).

Exfoliate or exfoliated shall mean individual platelets of a modified clay so that adjacent platelets of the modified clay can be dispersed individually throughout a carrier material, such as water, a polymer, an alcohol or glycol, or any other organic solvent.

Exfoliation shall mean a process for forming an Exfoliate from a modified clay.

Intercalant shall mean an organic molecule such as an ammonium ion that is absorbed between platelets of the layered material and complexes with the $Na^+$ cations on the platelet surfaces to form an Intercalate.

Intercalate or intercalated shall mean a Layered Material that includes organic molecules disposed between adjacent platelets of the Layered Material to increase the interlayer spacing between the adjacent platelets to at least about 5 Å, preferably at least about 10 Å.

Intercalation shall mean a process for forming an Intercalate.

Interior or interior layer shall mean a layer of a multilayer film which is not a skin or surface layer of the film.

Intermediate or intermediate layer shall mean an interior layer of a multilayer film which is positioned between a core layer and a surface layer of said film.

Laminating adhesive shall mean an adhesive between two substrates; typically laminating adhesives are thermosetting polymers such as polyurethane or epoxy that cure after they have been applied.

Layered Material shall mean an inorganic material, such as a smectite clay, that is in the form of a plurality of adjacent, bound layers and has a thickness, for each layer, of about 3 Å to about 50 Å, preferably about 10 Å.

Matrix monomer shall mean a monomer that the Intercalate or Exfoliate is mixed with or dispersed.

Matrix polymer shall mean a thermoplastic or thermosetting polymer in which the Intercalate and/or Exfoliate is mixed or dispersed to form a Nanocomposite.

Modified clay shall mean layered material that has undergone intercalation.

Nanocomposite shall mean a mixture that includes a monomer, polymer, oligomer, or copolymer having dispersed therein a plurality of individual platelets obtained from an exfoliated modified clay.

Optical properties shall mean properties including gloss, haze and clarity (all defined by Annual ASTM Book of Standards or TAPPI Test Methods)

Platelets shall mean individual layers of the Layered Material.

Polyamides shall mean a polymer with repeating amide groups (HN—CO) such as poly(hexamethylene sebacamide), poly(hexamethylene adipamide), poly(caprolactam) and poly(m-xyleneadipamide), and a copolymer of Nylon 6 with Nylon 6,6, which are also known as Nylon-6,10, Nylon 6,6, Nylon-6, MXD6, and Nylon 6/6,6, respectively.

Polyethylene shall mean families of resins obtained by substantially polymerizing the gas ethylene. By varying the comonomers, catalyst and methods of polymerization, properties such as density, melt index, crystallinity, degree of branching, molecular weight and molecular weight distribution can be regulated over wide ranges. Polyethylenes include low density polyethylenes (LDPE); medium density polyethylenes (MDPE); and high density polyethylenes (HDPE). Comonomers which are useful in the polyethylene resin family are alpha-olefins having from 4 to 20 carbons.

Polyethylene terephthalate (PET) shall mean a polyester formed by the condensation of ethylene glycol and terephthalic acid.

Polymer or polymer resin include but are not limited to, homopolymers, copolymers, such as for example, block, graft, random and alternating copolymers, terpolymers, etc., and blends and modifications thereof. Polymer or polymer resin shall also include all possible molecular configurations of the material. These structures include but are not limited to, isotactic, syndiotactic and random molecular configurations.

Polyolejins shall mean polymers of olefins such as, for example, ethylene, propylene, butenes, isoprenes and pentenes; including but not limited to homopolymers, copolymers, blends and modifications of said olefins.

Polyurethane shall mean polymers containing a urethane bond.

Smectite is a 2:1 type layer silicate with an expandable lattice carrying an excess negative layer charge. The 2:1 ratio refers to a layered structure consisting of an octahedral metal oxide sheet sandwiched between two tetrahedral silicon oxide sheets.

Surface or surface layer or skin or skin layer shall mean a layer of a multilayer film which comprises a surface thereof.

Tie resin or layer shall mean an adhesive comprised of thermoplastic polymer that has some affinity for materials it is meant to adhere to or bind together; typically tie resins are used in coextrusion or extrusion lamination and typically are polyolefin copolymers such as EVA, EAA or EMA, or polyolefins that are grafted with maleic anhydride (examples of grafted materials are Plexar® from Equistar and Bynel® from DuPont).

The mechanical properties of materials for plastic packaging are physical properties that relate to the response (deformation) of the material under an applied stress. Some important mechanical properties are tensile strength, stiffness (flexural modulus), compressive strength, and impact resistance (toughness). Concerning a container, mechanical properties relate to the deformation of the container under an applied stress or load. Such properties include top load, wall stiffness (resistance to buckling), and impact breakage resistance. Several standard ASTM tests for measuring mechanical properties of a material are listed below.

The term "thermal stability" relates to the changes in mechanical properties and dimensions of a container, with changes in temperature, especially at extremes of temperature. Some important measures of the thermal stability of a container are: shrinkage or relaxation at elevated temperatures; creep (gradual dimensional change) under load, especially at elevated temperatures; brittleness at cold temperatures; and loss of strength and stiffness at elevated temperatures. One standard method of gauging the degree of softening of a material at elevated temperatures is the heat deflection temperature (HDT), as defined in ASTM-648 below.

In the container industry, there is a need to improve the barrier and mechanical properties of the containers. It has been known to blend inorganic filler materials with a polymer material in containers in order to achieve these improved properties. However, this approach has not addressed the need completely as the inorganic filler may embrittle the container and/or detract from its optical properties (such as haze and transparency). It has now been found that the incorporation of nanosize particles of a modified clay into one or more of the polymeric layers of said containers can improve the barrier and mechanical properties without sacrificing, and many times improving, the mechanical, optical and other properties and polymeric nature of the material.

The containers of the present invention have improved barrier and/or mechanical properties and comprise at least one layer comprising a polymer material integrated with a modified clay wherein the modified clay is between about 0.5% to about 10% by weight of the total nanocomposite layer and most preferably between about 2% to about 7% by weight of the nanocomposite.

The clay minerals may be selected from the group consisting of smectite, vermiculite and halloysite. A preferred group is smectite clay wherein smectite may be selected from montmorillonite, saponite, beidellite, nontronite, hectorite and mixtures thereof. Particularly preferred smectite clay for use in containers is montmorillonite. The clay is usually present in a sodium ion exchange form. The clay may also be treated with an intercalant which assists in the integration of the clay with the polymer material. Procedures for intercalating the clay minerals and forming the nanocomposites have been described earlier.

One source for the clay is Southern Clay Products, Inc., of Gonzales, Tex. which markets the clay under the product name "Cloisite" which are particular formulations of the clay and other minor components. Another source for the clay is Nanocor, Inc. of Carmel, Ind., which markets the clay under the product name "Nanomer". However, those skilled in the art will recognize that many sources of the clay are available and those sources may have their own particular formulations which are not outside the scope of the present invention.

The containers of the present invention may comprise one or more polymeric layers wherein one or more of these layers may comprise a polymeric material integrated with nanosize particles of a modified clay between about 0.5% to about 10% by weight of the layer. The nanosize particles of clay have a thickness of between about 3 Å and about 50 Å, and an aspect ratio of between about 50 and about 1000.

Polymers suitable for use in the nanocomposites of the present invention are exemplified, but not limited to, polyolefins such as very low density polyethylene (LDPE), linear low density polyethylene (LLDPE), medium density polyethylene (MDPE), high density polyethylene (HDPE), and polypropylene (PP), polyamides such as poly(m-xyleneadipamide) (MXD6), poly(hexamethylene sebacamide), poly(hexamethylene adipamide) and poly(-caprolactam), polyesters such as poly(ethylene terephthalate), and polyacrylonitriles. Other polymers suitable for use in the nanocomposites of the invention include ethylene vinyl alcohol copolymers, ethylene vinyl acetate copolymers, polyesters grafted with maleic anhydride, PVdC, aliphatic polyketone, and LCP (liquid crystalline polymers). An example of a polyketone supplier is Shell and the product name of this polyketone material is "Carillon." An example of a liquid crystal polymer (LCP) supplier is Ticona, under the product name "Vectra." Further polymers that may be used include epoxy and polyurethane adhesives.

While certain clays have been exemplified above it is understood that any clay (both natural and synthesized) having a cation-exchange capacity of 50 to 200 milliequivalent/100 g and a large contact area with the polymer to be used in said nanocomposite are useful in the present invention.

The containers for flowable materials of the present invention may be produced by methods which are known in the art. These methods can be exemplified but not limited to blow molding which can be further exemplified by extrusion blow molding, injection blow molding, coinjection blow molding, sequential injection blow molding, overlay injection blow molding and stretch blow molding and any combination of these methods.

The containers of the present invention have many applications in the packaging industry. The applications can be exemplified but not limited to food containers, beverage containers, hot fill food containers and hot fill beverage containers.

The nanocomposites can be present in one or more of the layers of the container and/or in one or more of the layers of the finish, the base and/or main body sections of the containers of the invention. Additionally, the nanocomposites can also comprise a coating which can be applied as a label or an overwrap to the containers.

In the containers for flowable materials of the present invention the layer or layers comprised of a polymer material integrated with a modified clay may be present throughout the entire container/bottle or may only be present in a section of the containers/bottles. For example a container/bottle which comprises three sections, a finish, a body and a base (see FIG. 1) may only have the finish section of the container/bottle comprising a polymer material integrated with a modified clay.

In order to evaluate the barrier or mechanical properties of the containers/bottles of the present invention, the following tests can be employed.

ASTM F1249 is a test for determining the rate of water vapor transmission through flexible barrier materials. The water vapor transmission rate is defined as the time rate of water vapor flow normal to the surfaces, under steady-state conditions, per unit area.

ASTM D3985 is a test method which covers a procedure for determination of the steady-state rate of transmission of oxygen gas through plastic films. The oxygen transmission rate is defined as the quantity of oxygen gas passing through a unit area of the parallel surfaces of a plastic film per unit time under the conditions of the D3985 test method.

ASTM D638 is a test method which covers the determination of the tensile properties of unreinforced and reinforced plastics in the form of dumb-bell shaped test specimens when tested under defined conditions of pretreatment, temperature, humidity, and testing machine speed. In general, this test measures the uniaxial strain (elongation) of the sample as a function of applied stress.

ASTM D790 is a test method which covers the determination of the flexural properties of unreinforced and reinforced plastics, from samples generally in the form of rectangular bars molded directly or cut from sheet or plate stock. In general, this test measures the stiffness, or the resistance of a material to bending.

ASTM D648 is a test method which covers the determination of the temperature at which an arbitrary deformation occurs when specimens are subjected to a particular set of testing conditions. This test provides a measure of the temperature stability of a material, i.e., the temperature below which the material does not readily deform under a standard load condition.

Preferred embodiments of containers of the present invention having improved barrier or mechanical properties are presented in the following examples, which are presented for illustrative purposes only and are not intended to limit the invention in any manner.

EXAMPLE 1

An injection stretch-blow molded, multilayer PET bottle was made, having improved oxygen barrier from an MXD6 nylon nanocomposite barrier layer. The transparent bottle was blown from a preform that was produced by co-injection molding of PET resin and MXD6 nylon nanocomposite resin. The polymer resins used in the preform were KoSa #1101 PET and Mitsubishi Gas Chemical MXD6 nylon grade #6007. The nanoclay material that was incorporated into the nylon was treated montmorillonite, grade #30B Cloisite, from Southern Clay Products, Inc. The bottle filling-volume was 0.5 liter, and the total wall thickness in the body was about 0.33 mm. The thickness of the nylon nanocomposite barrier layer in the body was 0.025 mil, and this layer was sandwiched between the inner and outer PET layers. The table below indicates the reduction in oxygen transmission rate into the bottle owing to the presence of nanocomposite MXD6 rather than neat MXD6 in the barrier layer. The whole-bottle oxygen transmission rate was measured on a Mocon (Modern Controls, Inc.) instrument.

| Clay Weight Fraction in Nylon Barrier Layer, % | $O_2$ Transmission Rate, cc/bottle day |
| --- | --- |
| 0% | 0.015 |
| 5% | 0.004 |

EXAMPLE 2

An injection stretch-blow molded PET jar, with a finish diameter of approximately 70 mm, is made with a main body of monolayer PET and a finish of either monolayer PET-nanocomposite, or multilayer PET and PET-nanocomposite. The PET-nanocomposite in the finish improves the thermal stability (resistance to warping) of the finish and allows the jar to be hot-filled to temperatures of 200° C. The jar is blown from a preform produced by coinjection molding of PET and PET-nanocomposite. The PET nanocomposite contains from 1% to 10% nanoclay by weight, and is not necessarily transparent. Placement of PET-nanocomposite in the finish of the coinjected preform is accomplished by adjusting the coinjection process parameters, such that the material injected into the finish portion of the mold is substantially PET-nanocomposite.

EXAMPLE 3

An injection stretch-blow molded, three-layer PET bottle is made with a layer of PET-nanocomposite sandwiched between layers of neat (unfilled) PET. The PET-nanocomposite layer, with a thickness of 10% to 40% of the total wall thickness, substantially increases the hot fill temperature of the bottle, because of the improved thermal stability of the nanocomposite layer compared with neat PET. The PET nanocomposite contains from 1% to 10% nanoclay by weight, and is not necessarily fully transparent. The bottle is blown from a preform that was produced by co-injection molding of neat PET resin and PET-nanocomposite resin.

EXAMPLE 4

A multilayer polypropylene (PP) bottle produced by extrusion blow molding and containing an MXD6 nylon nanocomposite barrier layer, exhibits improved resistance to moisture induced degradation during retort processing. The structure of the bottle wall from outside to inside is: PP/regrind/adhesive/barrier/adhesive/PP. In a bottle containing an EVOH barrier layer, for example, the EVOH layer can absorb moisture and suffer a severe increase in $O_2$ permeability during retort processing at temperatures above 100° C. Replacing the EVOH barrier layer with a NaD6 nylon nanocomposite layer containing 1% to 10% nanoclay by weight can provide an $O_2$ barrier equivalent to 44% ethylene-EVOH under ambient conditions, and which does not degrade during processing.

What is claimed is:

1. A container for a flowable product comprising a finish, a main body and a base, having improved barrier and/or mechanical properties wherein at least one layer of only one of said finish, said main body and said base of said container comprises a nanocomposite, said nanocomposite comprising a polymer wherein the polymer is selected from the group consisting of polyolefins, polyamide, ethylene vinyl alcohol copolymers, ethylene vinyl acetate copolymers, polyesters grafted with maleic anhydride, PVdC, aliphatic polyketones and liquid crystalline polymers and nanosize particles of a modified clay.

2. A container according to claim 1, wherein the polyamide is selected from the group consisting of poly (hexamethylene sebacamide), poly(m-xyleneadipamide), poly(hexamethylene adipamide) and poly($\epsilon$-caprolactam).

3. A container according to claim 1, wherein said modified clay comprises a phyllosilicate.

4. A container according to claim 3, wherein said phyllosilicate is montmorillonite.

5. A container for a flowable product comprising a finish, a main body and a base, having improved barrier and/or mechanical properties wherein only said finish of said container comprises a nanocomposite layer, said nanocomposite comprising a polymer and nanosize particles of a modified clay.

6. A container according to claim 5 wherein the modified clay comprises montmorillonite.

7. A container according to claim 5 wherein the polymer comprises PET.

8. A container for a flowable product comprising a finish, a main body and a base, having improved barrier and/or mechanical properties wherein only said main body of said container comprises a nanocomposite layer, said nanocomposite comprising a polymer and nanosize particles of a modified clay.

9. A container for a flowable product comprising a finish, a main body and a base, having improved barrier and/or mechanical properties wherein only said base of said container comprises a nanocomposite layer, said nanocomposite comprising a polymer and nanosize particles of a modified clay.

* * * * *